United States Patent [19]

Waldrum

[11] 3,968,933

[45] July 13, 1976

[54] APPARATUS FOR HYDRAULIC PLANTING

[75] Inventor: John E. Waldrum, Ambler, Pa.

[73] Assignee: Amchem Products, Inc., Ambler, Pa.

[22] Filed: Jan. 27, 1975

[21] Appl. No.: 544,091

Related U.S. Application Data

[62] Division of Ser. No. 422,817, Dec. 7, 1973, Pat. No. 3,920,184.

[52] U.S. Cl. .............................. 239/171; 239/225; 239/562
[51] Int. Cl.² ..................... B05B 17/02; B64D 1/18
[58] Field of Search ........... 239/146, 159, 160, 162, 239/171, 172, 225, 380, 398, 433, 551, 562, 662, 246, 248; 244/136; 251/305–307

[56] References Cited
UNITED STATES PATENTS

| | | | |
|---|---|---|---|
| 1,604,290 | 10/1926 | King | 244/136 |
| 2,680,648 | 6/1954 | Price | 239/171 |
| 2,917,242 | 12/1959 | Waldrum | 239/551 X |
| 3,084,890 | 4/1963 | Hyde | 244/136 |
| 3,499,606 | 3/1970 | Smith | 239/171 X |
| 3,523,646 | 8/1970 | Waldrum | 239/171 |
| 3,684,177 | 9/1970 | Barlow | 239/171 |

Primary Examiner—Evon C. Blunk
Assistant Examiner—Andres Kashnikow
Attorney, Agent, or Firm—Caesar, Rivise, Bernstein & Cohen, Ltd.

[57] ABSTRACT

Methods and apparatus for dispensing seed or other particulate matter in the air to apply the particulate matter generally evenly over a target area on the ground. The seeds are entrained in a viscous, elastic carrier fluid, which facilitates the movement thereof through hydraulic equipment and holds the seeds together in the air to preclude segregation or drifting as the particles drop to the target area. The seed and carrier fluid mixture is either premixed and stored in storage chamber in the apparatus or is mixed immediately prior to being dispensed in the air.

One embodiment of the apparatus is utilized to broadcast seed over a relatively wide area and comprises a rotating spray head for dispensing the seed and carrier fluid mixture into the air.

Another embodiment of the apparatus is used to apply rows of crop seed and comprises a dispensing head for providing a narrow stream of the seed and carrier fluid mixture into the air.

19 Claims, 12 Drawing Figures

APPARATUS FOR HYDRAULIC PLANTING

This is a division of application Ser. No. 422,817, filed Dec. 7, 1973, now U.S. Pat. No. 3,920,184 which is relied upon and the entire disclosure and specification of which is hereby incorporated by reference.

As a result of the needs of a growing and mobile society, vast portions of land have been and are being dug up or otherwise disturbed such as in the construction of highways, rail lines, land fills, etc. Furthermore, the growing demands for power have resulted in the widespread despoilation of land such as that resulting from strip mining operations, fuel and electrical transmission line installations, etc.

In the interest of ecology it is of utmost importance to restore the land to a viable natural state. This can be accomplished by refilling and grading denuded land areas and thereafter planting with either a ground cover, such as grass, with agricultural crops or with trees. In such large scale planting operations, it is of considerable importance that the plant seeds be applied uniformly and that the operation be accomplished economically, that is, quickly and without wasting seeds.

While various conventional ground-operated mechanical spreaders are capable of applying seed evenly and without wastage over large areas, they operate rather slowly due to the inherent speed limitation imposed thereon by virtue of the fact that they are land based. For example, conventional ground-based mechanical spreaders are incapable of effectively applying seed at a rate greater than 10 to 12 acres per hour.

Hydraulic, ground-operated seeding equipment such as large centrifual pumps, rubber covered gear pumps and progressive cavity screw pumps have been used to deliver combinations of seed, fertilizer and mulch to areas to be seeded. While such equipment is capable of higher rates of seed application than mechanical spreaders, such equipment is rather expensive and is relatively inaccurate.

As an alternative to the use of ground-based seeding techniques, it has been suggested to utilize aircraft to dispense dry seed to a target area in a manner analogous to conventional crop spraying. While such a technique enables the use of higher seed application rates due to the higher land traversal speeds, such aerial seeding is, nevertheless, quite inefficient since the dry seed has a tendency to segregate and drift widely when dispensed into the air. This action frequently results in an extremely uneven application of seed on the target area and the application of seed to non-target areas adjacent the target area. Accordingly, when applying dry seed aerially, it has been found necessary to dispense significantly more seed than would be necessary when using ground-based spreading equipment in order to insure that sufficient seed reaches the target area.

In order to overcome the inherent drifting problems of aerial dry seeding, it has been proposed to dispense an aqueous slurry of seed into the air, in lieu of dispensing dry seed therein. Although such slurries, when dispensed aerially, tend to drift somewhat less than dry seed, significant drifting, nevertheless, still occurs as the shear forces of the wind separate the fluid and the seed. This is particularly true at high aircraft speeds or in high winds.

Furthermore, the equipment used to aerially dispense seed slurries is relatively large and expensive and is frequently jammed by the seeds as the seeds settle out of the slurry.

As is known to those skilled in the art, it is extremely difficult to move or pump seed or other particulate matter through hydraulic equipment. Accordingly equipment for performing such action is necessarily very large to provide large passageways through which the seeds can pass without jamming or being damaged by the pumps, valves, elbows, etc. making up the equipment. Heretofore, it has been unheard of to move seed or other particulate matter through small hydraulic equipment without jamming or damaging the equipment or the seed.

In large scale farm operations crop seed is normally planted in rows, with the seeds being equally spaced in the rows to effect uniform growth of the crop and to simplify the harvesting operation. Owing to the fact that aerially dispensed seeds tend to segregate and drift, aerial seeding techniques have not heretofore been used with success in planting crop seed.

Accordingly, it is a general object of this invention to overcome the disadvantages of the prior art in applying particulate matter to a target area on the ground from above the ground.

It is a further object of this invention to provide a method and apparatus to obtain a uniform distribution of seed or other particulate matter on a target area on the ground from above the ground.

It is still a further object of this invention to provide a method and apparatus for rapidly providing a line of uniformly spaced seeds along the ground from above the ground.

It is yet a further object of this invention to provide a method and apparatus for dispensing seed into the air and for precluding the segregation and drifting thereof such that the seed is deposited on a target area in a well defined pattern.

It is yet still a further object of this invention to provide a method and apparatus for dispensing seed in the air and for precluding the segregation and drifting thereof such that the seed is deposited on a target area in a well defined pattern and is held in place therein and in a manner to enhance germination.

It is another object of this invention to provide a method of preparing seeds or other particulate matter for passage through hydraulic equipment.

It is yet another object of this invention to provide a method for pumping seeds or other particulate matter through hydraulic equipment.

These and other objects of this invention are achieved by providing a method for depositing particulate matter in a well defined pattern in an area on the ground from above the ground. The method comprises the steps of providing a mixture of particulate matter and a viscous, elastic carrier fluid. The mixture is dispensed in the air above the area while the equipment traverses the area. The carrier fluid entrains the particles of the particulate matter in order to preclude them from segregating and drifting widely as the particles drop to the ground such that the particles are deposited generally evenly over said area.

Other objects of the invention are achieved by providing a method of preparing particulate matter for pumping by hydraulic equipment. The method comprises the steps of mixing the particulate matter with a viscous, elastic carrier fluid to form a suspension for supply to said equipment.

Still other objects of this invention are achieved by providing a method of pumping particulate matter through hydraulic equipment. The method comprises the steps of preparing the particulate matter by mixing it with a viscous, elastic carrier fluid to form a suspension and thereafter pumping said suspension through said equipment.

Still other objects of this invention are achieved by providing apparatus for dispensing particulate matter in a well defined area on the ground from above the ground. The particulate matter is suspended in a viscous, elastic carrier fluid. The apparatus comprises a dispensing head having an input chamber and at least one outlet nozzle coupled to said chamber, means for feeding the suspension to the chamber, and valve means for adjusting the rate at which the suspension is supplied to the chamber.

Other objects and many of the attendant advantages of this invention will be readily appreciated as the same becomes better understood by reference to the following detailed description when considered in connection with the accompanying drawings wherein:

FIG. 1 is a side elevational view of a portion of apparatus in accordance with one aspect of this invention for broadcasting seed or other particulate matter from the air to a target area on the ground;

FIG. 2 is a sectional view taken along line 2—2 of FIG. 1;

FIG. 3 is an enlarged sectional view taken along line 3—3 of FIG. 2;

FIG. 4 is a sectional view taken along line 4—4 of FIG. 3;

FIG. 5 is an enlarged sectional view taken along line 5—5 of FIG. 3;

FIG. 6 is a side elevational view of a portion of apparatus in accordance with another aspect of this invention for applying a line of seed or other particulate matter from the air to a target area on the ground;

FIG. 7 is a sectional view taken along line 7—7 of FIG. 6;

FIG. 8 is an enlarged sectional view taken along line 8—8 of FIG. 7;

FIG. 9 is a sectional view taken along line 9—9 of FIG. 8;

FIG. 10 is a top view of a portion of the target area showing the well defined pattern that seed or other particulate is deposited thereon by the apparatus shown in FIG. 1;

FIG. 11 is a top view of a portion of the target area showing two lines of seed or other particulate matter as applied by the apparatus shown in FIG. 6; and FIG. 12 is an elevational view of a portion of alternative means for use with the apparatus of FIGS. 1 and 6.

Referring now to the various figures of the drawing wherein like reference characters refer to like parts, there is shown in FIG. 1 apparatus 20 in accordance with one embodiment of this invention for broadcasting a mixture 22 of seed and/or other particulate matter and a carrier fluid into the air to deposit it in a well defined pattern on a target area on the ground in accordance with one method aspect of this invention.

The carrier fluid is a viscous, elastic, aqueous fluid whose viscosity approaches that of an invert emulsion and serves to entrain seed or other particulate matter therein. In accordance with the preferred embodiment of this invention, the carrier fluid basically comprises an invert-emulsion liquid polyacrylic terpolymer concentrate, such as that disclosed in U.S. Pat. No. 3,624,019, and water. Such concentrates, hereinafter referred to as polymeric concentrates, are sold under the registered trademarks "LoDrift" by Amchem Products, Inc., Ambler, Pa. 19002 and "EnDrift" by Nalco Chemical Company, Chicago, Ill. However, it will readily occur to those skilled in the art how to formulate other viscous carrier media of varying compositions for use in connection with the present inventions.

Depending upon desired application, the concentration of the polymeric concentrate in the carrier fluid is preferably within the range of one part concentrate in fifty parts water to one part concentrate in two hundred parts water. Additionally, a monotoxic surfactant compatible with all constituents such as X-77 obtainable from Colliodal Products, Inc. is added to the carrier fluid. The purpose of the surfactant is to act as a wetting agent to thereby aid in the dispersion of the polymeric concentrate in the water. In general, many surfactants are compatible in making up the carrier fluid. While anionic, cationic and nonionic surfactants may be used, it is preferable to use a nonionic surfactant, particularly when the particulate matter includes seeds, since such surfactants are generally less toxic to seed.

In some applications it may be desired to premix the seed and/or particulate matter and the carrier fluid prior to the dispensing operation. When premixed, the seed and/or other particulate matter and the carrier fluid form a suspension with the particles generally uniformly dispersed therein. In premixing the components, it has been found that the seeds and/or other particulate matter can be uniformly dispersed in the carrier fluid more quickly if the seed or other particulate matter is added to the carrier fluid. The carrier fluid is prepared by adding the surfactant to water, then the polymer is added thereto. If any trace additives are to be used, they are added to the fluid last. As an alternative to premixing, the seed or other particulate matter may in some applications be introduced into the carrier fluid immediately prior to dispensing.

Whether premixed or mixed immediately prior to dispension, the seed and/or other matter becomes entrained in the carrier fluid. In fact, it has been found that the carrier fluid seems to maintain any particular dispersion pattern of the seed and/or particulate matter produced during the mixing operation. This feature is of considerable significance in ensuring that the seed and/or other particulate matter passes easily through the equipment used to dispense it and that the seed and/or other particulate matter is dispensed in a relatively uniform and controlled pattern.

In accordance with this invention, the entrained seed may be of the same or different species and/or the same or different density and/or shape and may be pregerminated or partially pregerminated. Furthermore, additives such as inert planting media, like Attaclay or Fullers Earth, growth regulators, herbicides, fungicides, insecticides, bactericides and fertilizers may also be included in the mixture either singly or in combination.

Once dispensed into the air, the carrier fluid acts to prevent the entrained seed and/or particulate matter from segregating and drifting widely. In addition, the carrier fluid serves to weigh the seed down. The combined effect of these features is to ensure that the dispensed seed drops accurately to the target area so as to be applied uniformly and in a well defined pattern thereon. Furthermore, once on the ground, the viscous carrier fluid serves to hold the seed in place to reduce the tendency of the seed to be moved by environmental conditions, while providing a moist and hence favorable environment for the seed to germinate.

The apparatus 20 for broadcasting the seed into the air is adapted to be supported and carried over the target area by any suitable means. As shown in FIG. 1, the means comprises a helicopter 24, but it is to be understood that such means may alternately comprise other aerodynamically supported equipment, such as fixed wing aircraft, hovercraft, etc. In fact, in some applications, partially or totally land-based equipment may be used.

When broadcasting seed in accordance with a preferred embodiment of this invention, the seeding is accomplished by aerodynamically supported equipment to enable land traversal speeds of up to 30 m.p.h. which permits the seeding of up to 40 acres per hour, a rate approximately four times faster than prior art seeding techniques.

As can be seen, apparatus 20 basically comprises means 26 for storing seed and carrier fluid, a dispensing head 28 for spraying the mixture 22 of seed and carrier fluid into the air and means 30 for supplying the seed and carrier fluid to the dispensing head.

The means 26 comprise a pair of holding tanks in which a premixed suspension of seed and/or other particulate matter and carrier fluid is stored. Each tank includes an outlet (not shown) in its bottom wall. The outlet of each tank is coupled to a respective pipe or conduit 32. The conduits extend vertically downward from the bottom wall of the tank and then bend at an elbow 34 to extend horizontally. The horizontally extending conduits merge at a yoke 36 (FIG. 2) to form the main feed conduit 38.

In most operations, the suspension 22 is fed by gravity from the tanks through the respective outlets and associated conduits to the dispensing head 28. However, in some applications, it may be desirable to either pressurize the tanks 26 or to provide a pump in the supply means 30, i.e. within conduits 32 and 38, to force the suspension from the tank and through the supply means to the dispensing head.

In regard to the movement of seed or other particulate solids through hydraulic equipment, such as a pump, it should be noted that when such solids are put into a thin, non-elastic liquid medium, such as water, for use in hydrauliic equipment, the solids tend to precipitate and segregate and hence do not flow uniformly through the pipes and tubes of the equipment. In addition, the solids tend to jam up when passed around sharp corners or through relatively small apertures or when pressurized or placed under the influence of centrifugal force.

In accordance with another method aspect of this invention, seed and/or other particulate matter is prepared for use in conventional hydraulic equipment by mixing the seeds or other particulate matter with an elastic carrier fluid of the type described heretofore. In so doing, the solid particles become uniformly distributed in the liquid and do not separate therefrom due to hydraulic pressure or centrifugal force. This enables the particles to be readily passed through conventional and relatively small hydraulic equipment, such as small positive displacement pumps, without jamming the equipment or damaging the particles.

The dispensing head 28 of apparatus 20 is a rotating spraying device and, as can be seen in FIG. 3, basically comprises rotating means (to be described later) forming an input chamber 40 to which a plurality of outlet nozzles 42 are coupled, a stationary, central feed tube 44 and a valve assembly 46. The feed tube is provided to carry the suspension from the main feed conduit 38 of the supply means 30 to the input chamber 40, with the valve assembly regulating the rate of flow of the suspension.

The central feed tube is an elongated tubular member and includes a pair of ends. The upper end of the feed tube is sealed by a sight-glass assembly 47 for enabling one to look into the feed tube for maintenance purposes. The lower end of the feed tube is designated by the reference numeral 48 and serves as the valve seat for the valve means 46 such that when opened, it serves as the passageway through which the suspension passes into the chamber 40.

A lateral opening 50 is provided in the wall of the central feed tube adjacent the sight-glass assembly. An input pipe 52 is connected to the wall of the central feed tube contiguous with the opening 50 therein such that the interior of pipe 52 communicates with the interior of the central feed tube. A mounting flange 54 is provided at the FREE end of the input pipe and is connected to a corresponding flange at the free end of the feed conduit 38 such that the pipe 52 is in communication with the conduit 38.

As can be seen in FIG. 3, the interior of a hollow shell 56 forms the input chamber 40. The shell 56 includes a circular side wall 58 and a planar bottom wall 60. A plurality of orifices 62 are provided equally spaced around the periphery of the side wall 58 and extend therethrough, with the orifices being disposed immediately adjacent to the bottom wall 60. Each orifice is threaded. A plurality of tapered fingers 64, including threaded ends 66 are screwed into respective threaded orifices 62. Each finger includes a passageway 68 extending throughout its entire length and which communicates with the interior of the chamber 40 when the finger is screwed into its associated orifice. The free end of each finger is open and defines the nozzle 42.

As can be seen in FIGS. 3 and 5, the finger 64 extends in a generally radial direction to the longitudinal axis of the shell 56 while also extending downwardly at an acute angle to said axis. The shell 56 and fingers 64 extending therefrom together form what is referred to hereinafter as a spider and is given the reference numeral 70. The spider is adapted to be rotated rapidly, e.g. at 250–300 RPM, by means to be described later. The centrifugal force produced by the rapid rotation of the spider has the effect of forcing the suspension which is within chamber 40 from the chamber through the orifices 62, the communicating passageway 68 of the associated fingers 64 and the nozzles 42 into the air in the form of a spray.

The angular orientation of the fingers 64 ensures that a substantial component of the centrifugal force extends downwardly such that the suspension which is introduced into the air is directed downwardly. This action facilitates the accurate placement of the suspension on the ground target area as the apparatus traverses that area.

As can be seen in FIG. 3, an annular groove 72 is provided in the inside face of the circular side wall 58 and connects the orifices 62 disposed therein. The groove between adjacent orifices is of varying depth with the shallowest portion of the groove being midway between adjacent orifices and with the depth increasing with decreasing distance to the orifices. Such a groove arrangement serves to ensure that the suspension does not become trapped on the inner surface of the side wall between adjacent orifices. Instead, the centrifugal force resulting from a rotation of the spider forces the suspension to slide down the grooves and out of the orifices.

The means for rotating the spider 70 basically comprise a motor 74, which is stationarily mounted on the central feed tube 44, and transmission and connection means 76 for connecting the spider 70 to the motor 74 and for transmitting rotational force from the latter to the former.

In accordance with the preferred embodiment of this invention, the motor is an electric motor and is mounted on a hollow platform 78. The platform includes a central opening 80 through which the central feed tube 44 extends. The portions of the platform contiguous with the central opening 80 are welded to the outside surface of the feed tube to secure the platform in place. An offset opening 82 is provided in the platform immediately below motor 74 and serves as the passageway through which a drive shaft 84 of the motor extends. The shaft 84 terminates at its free end in a drive gear 86.

The transmission means 76 basically comprises a main gear 88, a tubular connecting housing 90 connected to the main gear 88 and disposed about the central feed tube 44 and two sets of bearings 92 for enabling the housing to freely rotate about the feed tube. The housing 90 includes a flange 94 at its upper end and a flange 96 at its lower end. The upper flange 94 abuts and is connected, via bolts 98, to the main gear 88. The lower flange 94 abuts and is connected to the shell 56 of the spider 70, via bolts 100.

As can be seen, the inside wall of housing 90 adjacent the flange 94 includes a recessed portion 102 into which a portion of one of the bearing sets 92 is disposed and connected, with the other portion of the bearing set being connected to the outside surface of the central feed tube. The other bearing set is also interposed between the housing 90 and the central feed tube and is disposed immediately below a raised portion 104 on the inside surface of the housing. The raised portion serves to keep the bearing sets 94 spaced from one another.

A circular gasket 106 is provided at the interface between the lower flange 96 and the shell 56 to preclude any fluid from leaking out of the chamber 40 through that interface. The gasket is held in place by plural screws 108. A stack of circular seals 110 is disposed about the central feed tube and is interposed between the inside surface of the housing 90 and the central feed tube.

The rotation of the spider 70 is effected as follows: Upon the receipt of electrical power from means (not shown), the motor 74 begins rotating the drive shaft 84 and the drive gear 86 connected thereto. The teeth of the drive gear mate with corresponding teeth of the mean gear 88 to cause the latter to begin rotation, whereupon the housing 90 and the spider 70 connected thereto begin rotation.

In order to establish the rate at which the suspension is introduced into the input chamber 40 from the central feed tube 44, the adjustable valve assembly 46 is disposed within the feed tube adjacent its open end 48.

The valve assembly basically comprises a planar valve 114 adapted to move into engagement with the valve seat 48 to seal the end of the feed tube and thereby isolate the input chamber 40 from the feed tube and means 116 for moving the valve 114 into and out of engagement with the valve seat. The valve 114 is a generally planar member and includes a soft washer 118 which is adapted to abut the valve seat. A rigid backing plate 120 is mounted on the back side of the washer 118 and is of smaller area than the washer so as not to interfere with the seating thereof on the valve seat. The backing plate 120 serves to stiffen the washer. A rigid front plate 122 is mounted on the front side of the washer to provide additional rigidity. The plates 120 and 122 and the interposed soft washer 118 are held together by a bolt 124, with a rigid washer 126 disposed between the plate 120 and the head of the bolt 124.

A plurality of longitudinally extending guides 128 are connected to the backing plate 120 of the valve 114 and abut the inner surface of the central feed tube 44. The guides 128 are adapted to slide longitudinally along the inner surface of the feed tube to ensure that the valve does not skew, irrespective of its position with respect to the valve seat. This action ensures that a precise suspension flow rate can be maintained at any valve position. Two of the guides also serve as means to which the valve moving means 116 is connected.

Figure 1:
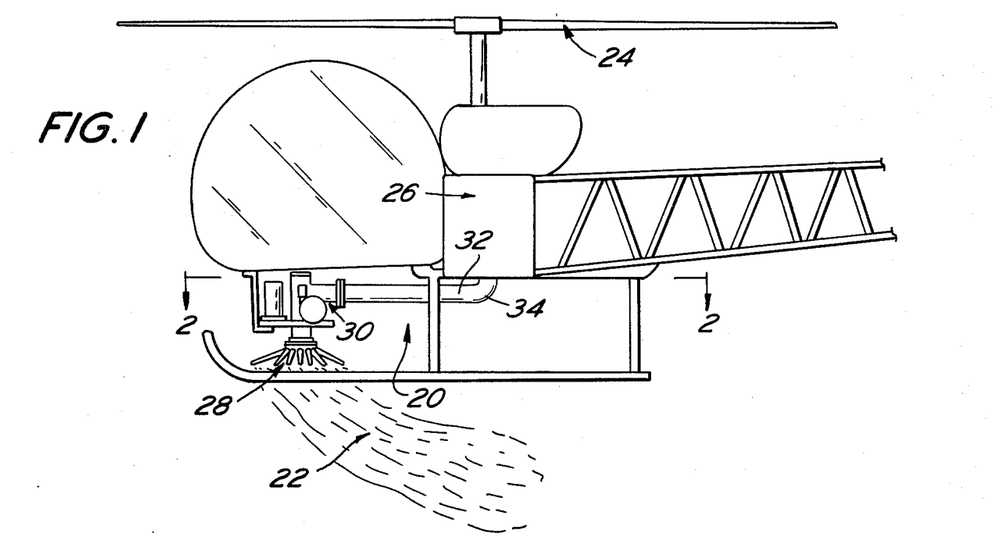
Figure 2:
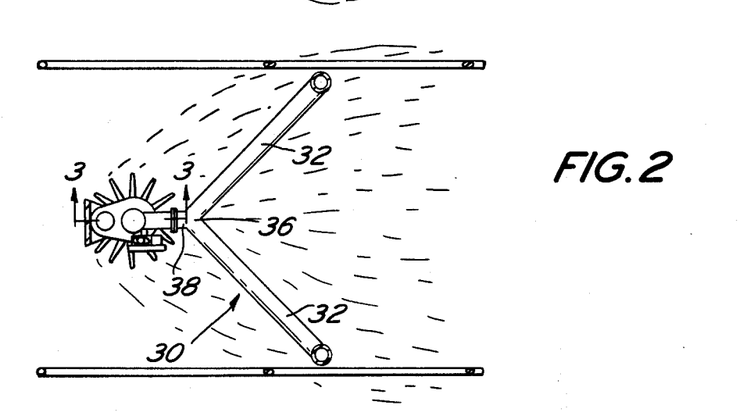
Figure 3:
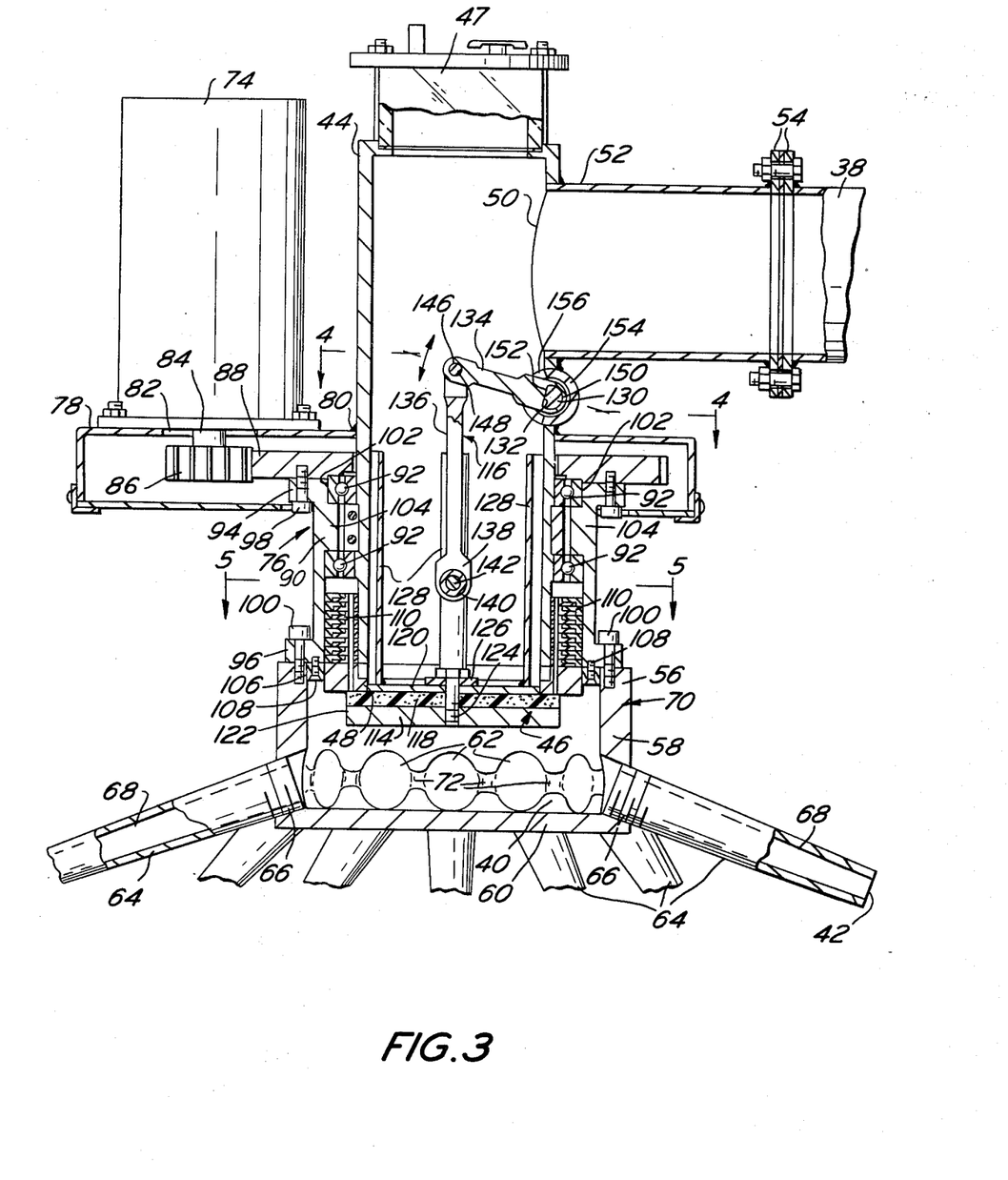

As can be seen in FIG. 3, the valve moving means 116 comprises a crank shaft 130 having a flat surface 132 thereon, a bell crank 134 connected to the shaft 130 and a bell crank arm 136 pivotally connected to the bell crank 134. The bell crank arm 136 is an elongated member which terminates at its lower end in an enlarged portion 138 having an opening 140 therein.

Figure 5:
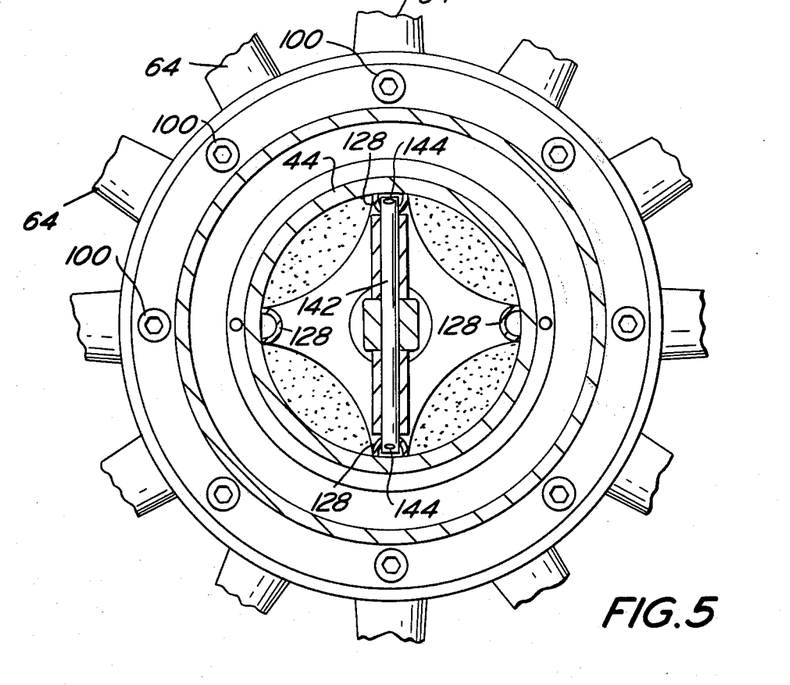

As can be seen in FIG. 5, an elongated connector shaft 142 extends through the opening 140 in the lower portion of the bell crank arm and is normal to the longitudinal axis of the arm. Each end of the connector shaft 142 is disposed within a respective hole in one of the guides 128 and is held in place therein via a respective mounting pin 144.

The upper end of the bell crank arm 136 includes an opening 146 into which a pivot pin 148 is disposed. The pivot pin serves to connect the bell crank arm 136 to one end of the bell crank 134. The other end of the bell crank includes an opening 150 having a flat edge 152 and into which the crank shaft 130 extends, with the flat surface 134 thereof abutting the flat edge of the opening. The crank shaft is disposed within a tubular casing 154 having an angled slot 156 cut in its side wall and through which the bell crank 134 extends. The crank shaft 130 is arranged to be rotated about its longitudinal axis by means to be described later to effect the angular displacement of the bell crank. As should be appreciated, the angular displacement of the bell crank causes the bell crank arm to move either down or up depending upon the direction of rotation of the bell crank and hence results in the movement of the valve either away from or towards the valve seat. When the crank shaft 130 is rotated in a clockwise direction to its extreme position, the valve 116 abuts the valve seat 48 to isolate the input chamber from the central feed tube and hence stop the flow of suspension to the input chamber. When the crank shaft is rotated counterclockwise to its extreme position, the valve is moved furthest away from the valve seat and the rate at which the suspension 22 is enabled to flow into the chamber 40 is greatest. At intermediate angular positions of the crank shaft, the rate of flow of suspension into the input chamber is intermediate and a function of the angular position of said shaft.

Accordingly, it should be appreciated by those skilled in the art that by merely causing the crank shaft to be rotated to a particular angular position, the valve 114 is correspondingly positioned to establish a desired flow rate of suspension to the spider.

Figure 4:
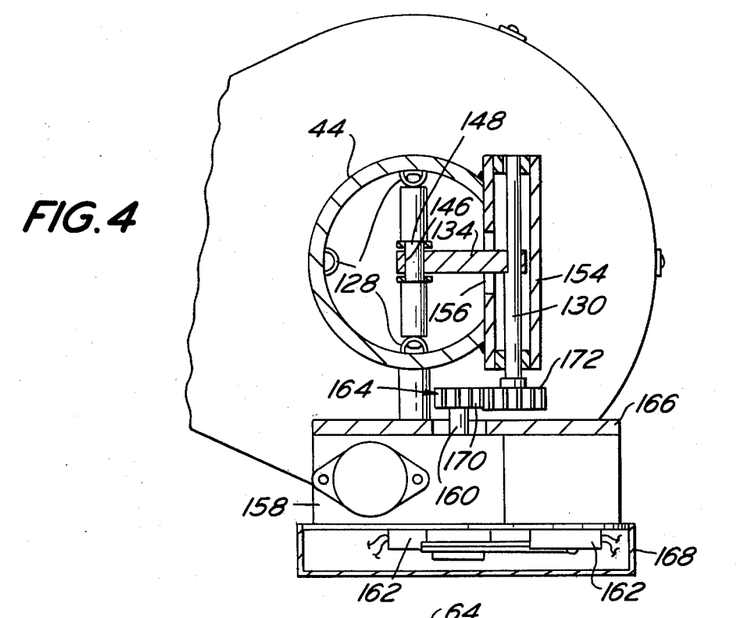

The means for rotating the crank shaft 130 is shown in FIG. 4 and basically comprises an electrical motor 158 having a rotating drive shaft 160, a pair of electrical control switches 162 and a gear transmission 164 connected between the shaft 160 and the crank shaft 130 and adapted to cause the latter to rotate under the influence of the former. The motor 158 is mounted on a support 166 disposed adjacent the crank shaft casing 154. The control switches 162 are disposed within a housing 168 adjacent the motor and are electrically connected to the motor. One of the switches is arranged, when energized by means (not shown) to cause the motor to rotate clockwise and the other switch is arranged, when energized by said means, to cause the motor to rotate counterclockwise. The transmission 164 comprises a drive gear 170 connected to the end of the drive shaft 160 and a complimentary main gear 172 connected to the crank shaft 130.

As an alternative to premixing the seed and/or other particulate matter and the carrier fluid, it is desirable in some applications to insert the seed or other particulate matter into a flowing stream of carrier fluid immediately prior to emitting the resulting mixture into the air. Such a technique is referred to hereinafter as injection feeding and is desirable in applications wherein the carrier fluid used is less effective in suspending the seed and/or other particulate matter than the heretofore disclosed polymeric concentrate-based fluids but is sufficiently effective to carry the seed from the air to the ground in a controlled pattern. Furthermore, in seeding applications necessitating the use of relatively large seeds or where seed-liquid ratios need to be varied, injection feeding is also preferable to the use of premixed suspensions. The use of injection feeding is of particular utility in applications in which the velocity of the mixture at the emission point must be high to counteract the undesirable dispersing effect on the mixture which would result from high winds or high forward aircraft speeds, since the use of a premixed suspension necessitates the use of relatively large nozzle apertures which has the effect of reducing exit velocity.

In accordance with another preferred embodiment of this invention, the injection feeding of seed and/or other particulate matter is accomplished by the use of injection feeding means 174 which is shown in FIG. 12. As can be seen therein, the means 174 basically comprises a tank 176 from which the carrier fluid is dispensed into a feeding conduit 178 which is connected to the main feed conduit 38, a tank 180 from which the seed and/or other particulate matter is dispensed and a venturi device 182 in the conduit 178 for injecting the dispensed seed and/or other particulate matter into the conduit.

Preferably, the tank 176 is pressurized to force the carrier fluid into the conduit 178 and to the venturi device, but alternatively the tank may be unpressurized and a pump may be inserted in the conduit between the tank 176 and the venturi device. The seed tank 180 is preferably unpressurized such that the seed is dispensed by gravity into an inlet port 184 in the venturi device 182 via pipe 186.

As can be seen, the device 182 is a conventional venturi type feeding device and includes a main or carrier passageway 188 having a reduced diameter or a necked-down portion 190 therein, with the diameter of the passageway 188 increasing downstream of the portion 190 and with an inlet port 184 merging at an acute angle with the carrier passageway immediately downstream of the necked-down portion.

As will be appreciated by those skilled in the art, the necked-down portion of the venturi device increases the velocity of the carrier fluid which is introduced into the carrier line. The relatively high velocity of the fluid passing by the point in which the inlet port merges with the carrier passageway has the effect of pulling the seed from that port into the fluid. The resulting mixture of seed and carrier fluid is then carried by the remaining portion of the conduit 178 to the feed conduit 38 and from thence to the dispensing head 28 for emission into the air.

In FIG. 10 there is shown a portion of a ground target area 192 showing the controlled pattern which the seed-carrier fluid mixture is applied thereto by the broadcast spraying method and associated apparatus of this invention. As can be seen, the seed 194 is generally uniformly spread evenly across the ground in a controlled pattern of a large plurality of closely spaced groups or clumps of seed, with approximately three to five seeds per clump.

In accordance with another aspect of this invention, there is provided a method and apparatus for planting rows of seed on a target area on the ground from above the ground at a relatively high rate of speed. The method, hereinafter referred to as row seeding, entails the use of a mixture and seed and/or other particulate matter and a carrier fluid, like that used in the broadcast seeding method of this invention. The mixture is formed by either premixing the seed and carrier fluid to form a suspension or by the injection technique discussed heretofore. Irrespective of the manner in which the seed and carrier fluid are mixed, the resultant mixture, containing the entrained seeds, is dispensed into the air in a narrow stream 194 by moving the dispensing means through the air over the target area. The forward motion of the dispensing means coupled with the inertia of the stream causes the elastic carrier fluid of the stream to string out or stretch downstream of the emission point with the diameter of the stream decreasing with increasing distance from the emission point to the point at which the stream makes contact with the ground. When the stream is dispensed at a constant velocity and height above the target area, the diameter of the stream contacting the target area remains constant. The stringing out of the carrier fluid downstream of the emission point has the effect of pulling the seed or other particulate matter entrained therein into the stream. This phenomenon orients the seed or other particles in a relatively uniform line and effects the automatic spacing of the particles in the stream. Accordingly, when the stream is dispensed at a constant velocity and height above the ground, the length of the stream between the emission point and the ground will be constant such that the spacing between the seeds on ground is constant. This feature is of considerble importance in that it enables one to plant crop seed in rows with precise spacing between the seeds to thereby simplify the subsequent harvesting operation.

If the seeds are ovate in shape or otherwise include a major or longitudinal axis, the stretching out of the stream in the air orients the seeds so that their major axis lies along the longitudinal axis of the stream. This feature can be of significant importance in the planting of certain crop seeds wherein the ultimate position or orientation of the crop to be harvested is established by the orientation of the seed on the ground. For example, ears of corn normally extend outwardly from the stalk on opposite sides of the stalk and normal to the axis of the seed from which the stalk grows. Accordingly, when corn is dispensed aerially in accordance with this invention, the corn seeds deposited on the earth will all be aligned along their major axis, whereupon the resulting ears of corn all extend normal to the row in which the seeds were planted. This action enables the harvesting of the corn to be accomplished quickly and easily.

The preferred apparatus for carrying out the row seeding of this invention is denoted by the reference numeral 200 in FIG. 6 and is adapted to be supported and carried over the target area by any suitable means. As shown in FIG. 6, the means comprise a helicopter 202 but it is to be understood that such means may alternately comprise other aerodynamically supported equipment, such as fixed wing aircraft, hovercraft, etc. In fact, in some applications, partially or totally land-based equipment may be used.

When row seeding in accordance with the preferred embodiment of this invention, the seeding is accomplished by aerodynamically supported equipment to enable land traversal speeds of up to 30 miles per hour which permits the seeding of up to 1,500 acres per hour, a rate approximately 10 times faster than prior art crop planting techniques.

The apparatus 200 basically comprises means 204 for storing seed and carrier fluid, a plurality of dispensing heads 206 for dispensing a plurality of streams 194 of a mixture 22 of seed and carrier fluid into the air and means 208 for supplying the seed and carrier fluid to the dispensing heads.

The means 204 comprise a pair of holding tanks in which a premixed suspension of seed and/or other particulate matter and carrier fluid is stored. Each tank includes an outlet (not shown) in its bottom wall. The outlet of each tank is coupled to a respective pipe or conduit 210. The conduits extend vertically downward from the bottom wall of the tank and then bend at an elbow 212 to extend horizontally. The horizontally extending conduits merge at a yoke 214 (FIG. 7) to form the main feed conduit 216. The main conduit 216 includes a flange 218 (FIG. 8) at its end for connection to a similar flange of an input pipe 220. The input pipe serves as the input to a hollow boom-like member 222 and is connected thereto and communicates therewith through a hole 224 in the wall of the member. The interior of the boom-like member defines a main chamber 226. The dispensing heads 206 are mounted at equally spaced locations along the boom and each communicates with the main chamber 226 of the boom.

In most operations, the suspension 22 is fed by gravity from the tanks through their respective outlets and associated conduits to the dispensing heads 206, however, in some applications, it may be desirable to either pressurize the tanks 204 or to provide a pump in the supply means 208, i.e. within conduits 210 and 216, to force the suspension from the tank and through the supply means to the dispensing heads.

As can be seen in FIGS. 7 and 8, the dispensing heads 206 are mounted on the underside of the boom-like member and extend downwardly. The heads 206 are identical in construction and each basically comprises a hollow shell 228 defining an input chamber 230, a nozzle 232 coupled to the chamber 230 and a valve 234 for establishing the rate at which the suspension 22 is provided from the boom-like member into the input chamber.

Each shell 228 includes a circular side wall 236 which is connected to the boom-like member 222 at portions contiguous with an outlet hole 238 disposed in the bottom of the member. The bottom wall 240 of the shell is funnel-shaped and includes an outlet port 242 at the lowest point thereof. A tubular finger is connected to the outlet port 242 and extends downwardly for a short distance therefrom, then bends at elbow 244 to extend horizontally backward and terminates in its free end at nozzle 232.

The rate adjusting valve 234 is of the butterfly-type and is adapted to be rotated to various angular positions within the shell 228 to establish the rate at which the suspension is provided into the input chamber 230. To that end, the valve 234 includes a soft washer 246 interposed between a pair of stiff backing plates 248 and mounted for rotation on a shaft 250. The ends of the shaft pass through aligned holes 251 (see FIG. 9) in the circular side wall of the shell.

Each shaft 250 is coupled to means 252 for rotating the shaft through a predetermined angular displacement. In accordance with the preferred embodiment of this invention, the means 252 is common to all of the dispensing heads and all of the shafts 250 thereof are identically coupled to the means 252 with the valves 234 of the dispensing heads oriented at the same angle with respect to their associated shaft. This arrangement enables the means 252 to move the valves in unison to the desired angular displacement to ensure that the rate of flow of the suspension to the input chamber of each dispensing head is identical, thereby ensuring the rate at which the mixture is dispensed, into the air by each dispensing head is the same.

As can be seen in FIGS. 8 and 9, the means 252 include a solenoid 254 and a common drive shaft 256. The drive shaft 256 extends the entire length of the boom-like member 222 (see FIG. 7) and is supported within plural aligned braces 258 which project from the outer surface of the member 222. Each shaft 250 of each dispensing head is connected to the common drive shaft 256 via respective linkage means 260. The linkage means 260 are equally spaced along the common drive shaft 256 and are disposed immediately adjacent respective dispensing heads.

The linkage means 260 comprise a bell crank 262, having an opening 264 through which the common drive shaft 256 extends and is connected and an extending arm 266. The arm 266 is pivotably connected to one end of link 268. The other end of link 268 is connected to one end of link 270, the other end of which is fixedly connected to one end of the shaft 250 on which the butterfly valve 234 is mounted.

The solenoid 254 is mounted on a support 272 under the boom-like member 222 and is adapted to rotate the common drive shaft 256 about its longitudinal axis, via a second arm 274, which projects from the bell crank that is disposed immediately adjacent the solenoid. To that end, the second arm of that bell crank is connected to the reciprocating arm 276 of the solenoid.

Operation of the dispensing heads 206 are as follows: An electrical signal from means (not shown) under the control of the equipment operator is provided to the solenoid 252. The energization of the solenoid causes the lateral displacement of arm 276. The lateral displacement of arm 276 is coupled, via arm 264, to the common drive shaft 256 to cause the angular displacement thereof about its longitudinal axis. The angular displacement of the common drive shaft causes arms 262 of each of the bell cranks to rotate through the same angular displacement, thereby coupling the angular rotation through the associated linkage means 260 to the associated butterfly valve 234 to cause said valve to rotate to a corresponding angular position. The angular position of the valve determines the rate of flow of suspension from the interior of chamber 266 into each of the input chambers 230 and from thence through the associated fingers 244 and nozzles 232 into the air.

As should be appreciated, when the valve is rotated to the horizontal position wherein its soft washer 246 makes contact with the interior walls of shell 228, no suspension is enabled to pass into the input chamber and thus to the air through nozzle 232. When valve 234 is rotated to the vertical angular position, a maximum rate of flow of suspension occurs.

Figures 7, 12:
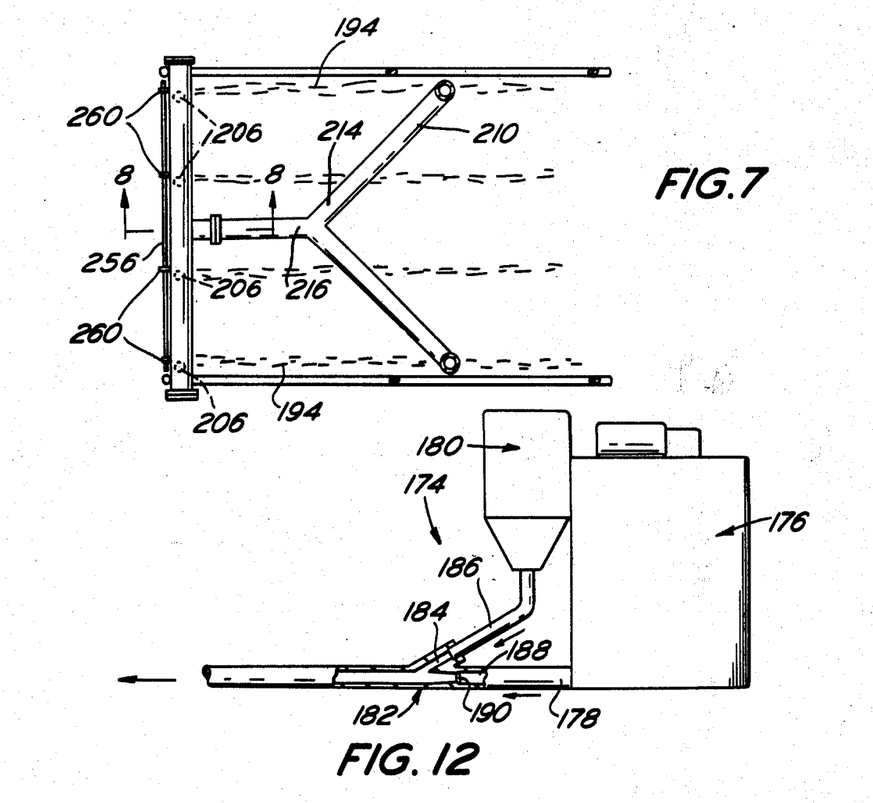
Figure 8:
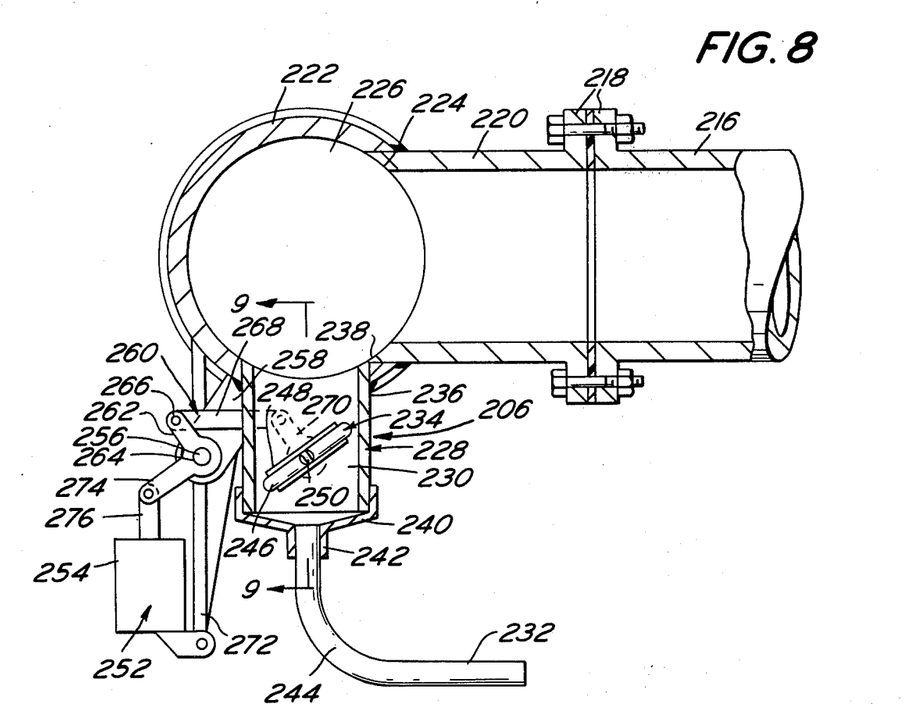
Figure 9:
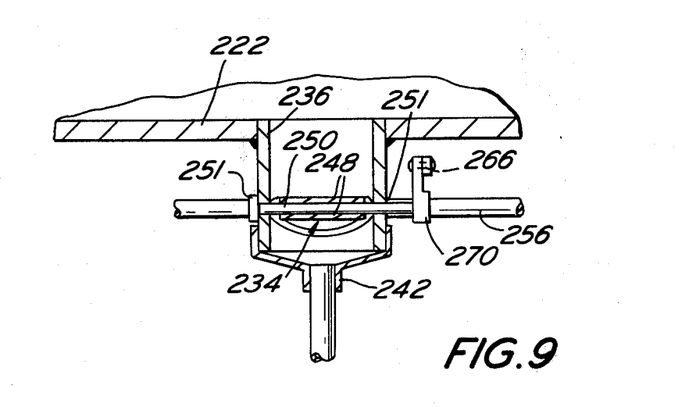
Figure 10:
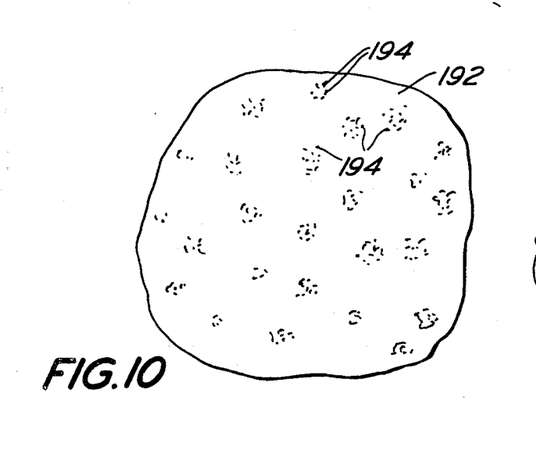

As an alternative to premixing the seed and/or other particulate matter and the carrier fluid, the particulate matter may be introduced into the flowing stream of carrier fluid immediately prior to emission into the air using the identical injection feeding technique and apparatus as described heretofore. Accordingly, the apparatus shown in FIG. 12 may be used to provide seed into the carrier fluid which is fed to line 216 and from thence to the individual dispensing heads 206.

Figure 6:
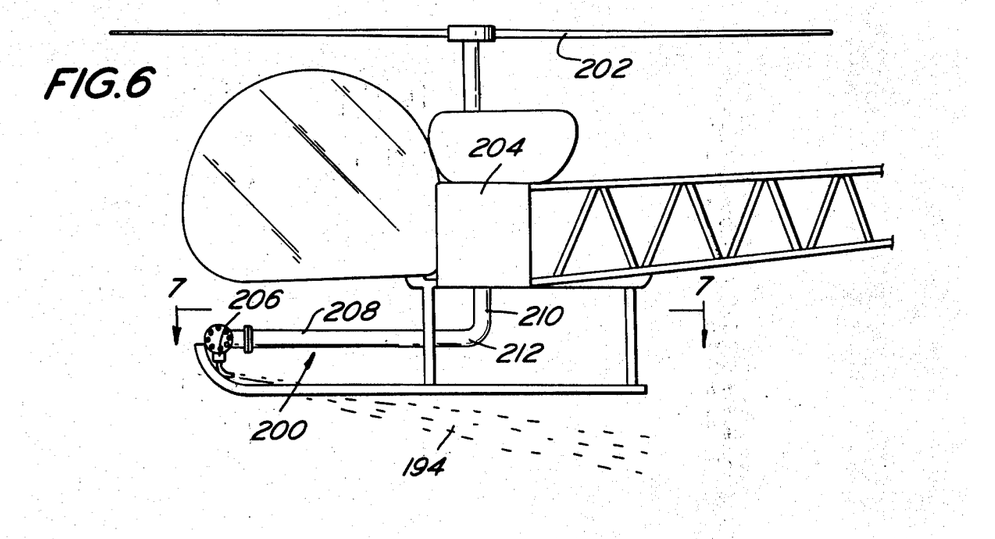
Figure 11:
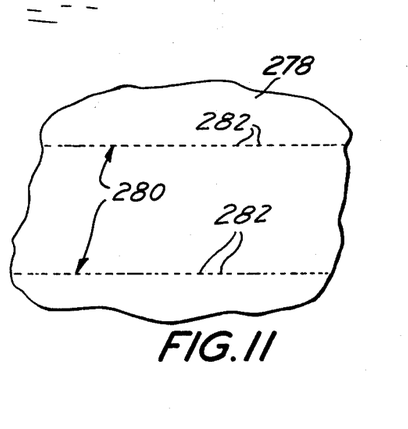

In FIG. 11 there is shown a portion of a ground target area 278 which is typical of a farm field, showing two lines 280 of seeds which have been applied using the method and apparatus of FIG. 6. As can be seen, the seeds 282 of each line 280 are uniformly spaced in each line or row.

As should now be appreciated from all of the foregoing, this invention enables one to readily move seed and/or other particulate matter through relatively small hydraulic equipment and enables the use of such equipment in readily applying seed and/or other particulate matter in a controlled pattern to a target area on the ground from above the ground at a high rate of speed and without wastage.

The aerial seeding of this invention may be in the form of broad band or broadcast seeding, such as used in the seeding of land fills or reclaimation projects, or row seeding such as used in the seeding of farm fields.

In either type of seeding operation, the seed and/or other particulate matter is mixed with an elastic viscous carrier fluid which acts to entrain it therein. In so doing, the seed is enabled to be readily moved through hydraulic equipment to be dispensed in the air above the target area. Once dispensed within the air, the seed and/or other particulate matter is held within the carrier fluid in a controlled dispersion pattern to ensure that it does not segregate or drift widely as it drops to the target area. This latter feature ensures that the seed and/or other particulate matter is deposited in a controlled pattern precisely on the target area. Once on the ground, the carrier fluid tends to hold the seed and/or other particulate matter in place and provides a hospitable environment for the seed to germinate.

In some seeding applications in accordance with this invention, it may be desirable to use pregerminated or partially pregerminated seed to speed up the growth process. Additionally, additives can be included to aid in the germination of the seed and to aid the seedling in establishing itself after germination.

Coloring may be added to the carrier fluid to make the applied seed visible from the air to enable the equipment operator to determine the areas which have been seeded on previous traversals of the target area.

Without further elaboration, the foregoing will so fully illustrate my invention that others may, by applying current or future knowledge, readily adapt the same for use under various conditions of service.

What is claimed as the invention is:

1. Apparatus for dispensing a suspension of particulate matter and an elastic carrier fluid in a well defined area on the ground from above the ground, said apparatus comprising, a spray head and means for rotating said spray head, said spray head having a common central chamber having an entrance, with plural nozzles projecting radially therefrom and in fluid communication therewith, each of said nozzles including an open orifice and with no valve means between said chamber and said orifices, means for feeding the suspension to said chamber, and a common valve at the entrance of said chamber and in fluid communication with said feeding means and said chamber for adjusting the rate at which said suspension is supplied to said chamber, whereupon said suspension is enabled to freely flow through said valve means, said chamber and out of said open orifices as the result of the rotation of said spray head.

2. The apparatus of claim 1 wherein said feeding means comprise storage means for storing said suspension therein and conduit means for carrying the suspension from the storage means to the chamber.

3. The apparatus of claim 1 wherein said feeding means comprise conduit means for carrying said suspension to said chamber, means for providing the particulate matter to said conduit means for providing the carrier fluid to said conduit means.

4. The apparatus of claim 1 wherein each nozzle also extends at an acute angle to said axis.

5. The apparatus of claim 4 wherein said means for rotating said spray head comprises a motor.

6. The apparatus of claim 4 wherein each nozzle is in the form of an extending tubular arm and wherein each arm includes an inlet port freely communicating with a respective orifice in said chamber.

7. The apparatus of claim 6 wherein said chamber includes a curved wall, with said orifices being disposed in said wall and equally spaced about said wall.

8. The apparatus of claim 7 wherein said curved wall includes an annular groove connecting said orifices.

9. The apparatus of claim 4 wherein said feeding means comprises a feed tube terminating in a valve seat at said common chamber and with said common valve interposed between the valve seat and said chamber.

10. The apparatus of claim 9 wherein the common valve comprises a washer which, when said valve is closed, abuts the valve seat to close the end of said feed tube, and is adapted to move away from the end of the feed tube to enable said suspension to pass into said chamber.

11. The apparatus of claim 10 additionally comprising a motor to move said washer away from said valve seat.

12. The apparatus of claim 5 wherein the motor is mounted on stationary means and is coupled to the rotating spray head by transmission means.

13. The apparatus of claim 12 wherein the transmission means comprises at least one gear.

14. Apparatus for depositing particulate matter in a well defined area on the ground from above the ground, said particulate matter being suspended in an elastic carrier fluid, said apparatus comprising a dispensing head for dispensing said suspension in a narrow stream, said dispensing head having an input chamber and at least one output nozzle coupled thereto, means for feeding said suspension to said chamber and comprising storage means for storing said suspension and conduit means carrying said suspension from the storage means to the chamber, and valve means for adjusting the rate at which said suspension is applied to said chamber, said valve means comprising a butterfly valve disposed within said chamber and adapted to be rotated to various angular positions to establish the rate at which the suspension is dispensed to the air.

15. The apparatus of claim 14 wherein motor means are provided to rotate the valve to a desired angular position.

16. The apparatus of claim 14 wherein said apparatus comprises plural dispensing heads.

17. The apparatus of claim 16 wherein said dispensing heads are connected to said conduit means.

18. The apparatus of claim 17 wherein said conduit means comprises a boom and wherein said dispensing heads are equally spaced along said boom.

19. The apparatus of claim 18 wherein the valves in each of the dispensing heads are coupled to one another to operate in unison.

* * * * *